Oct. 24, 1961 H. KIETZ 3,005,973
SUBMARINE LOCATING SYSTEM
Filed Feb. 11, 1955 2 Sheets-Sheet 1

INVENTOR.
HANS KIETZ
BY
Ezekiel Wolf, Wolf & Greenfield
ATTORNEYS

INVENTOR.
HANS KIETZ 3,005,973
SUBMARINE LOCATING SYSTEM
Hans Kietz, Bremen, Germany, assignor to Atlas-Werke Aktiengesellschaft, Bremen, Germany, a firm
Filed Feb. 11, 1955, Ser. No. 487,494
Claims priority, application Germany Feb. 13, 1954
6 Claims. (Cl. 340—3)

This invention relates to a system for locating submarine objects by means of fixedly directed sound pulses emitted from a ship under way and reflected by these objects. Such objects or obstacles the detection and location of which may be desired are mines and wrecks on the sea-bed and schools of fish in the sea.

Devices commonly employed on board ship for this purpose necessitate the provision of a rotatable sound projector for transmitting and receiving sound pulses in varied directions. Such an installation takes valuable space and involves considerable changes in the hull of the ship. A high directivity of the projector is desirable with a view to lowering the reverberation level. However, the resistance created by the motion through the water prevents improving the directivity by increasing the linear dimensions of the radiating surface. Moreover, no lasting record of the obstacles encountered may be obtained.

In the system according to the invention a considerable simplification is effected by employing one or two substantially unidimensional transducers transmitting and receiving sound pulses in fixed directions and having a length of more than 10 wave lengths of the sound transmitted, this length being parallel to the fore-aft line of the ship. These transducers have a beam which is symmetrical about a plane at right angles to the longitudinal axis of the transducers and the fore-aft line of the ship and its width in a direction perpendicular to that plane may be one degree or less. This enables accurately to locate the position of objects beside the course of the ship and is favorable, for instance, in obtaining a high ratio of the intensity of the useful echo to that of the bottom reverberation in shallow water. A much larger width of the beam is provided in a plane transverse to the fore-aft line. In order to minimize the disturbing influence of surface reverberation the intensity of the radiation striking the surface of the sea from below must be small. Likewise, in shallow water, it is undesirable to emit sound vertically downwards due to the multiple echoes produced thereby. This means that the sound beam may fill a rather large portion of a quadrant in the transversal plane situated below the horizontal. For obtaining such a pattern the vertical dimension of the radiating surface of the transducers is made small in comparison to the horizontal length, in particular, of the order of a wave-length of the sound.

The largest dimension of the transducers being parallel to the fore-aft line, the area producing flow resistance is small and independent of the length of the transducers. Thus, there is no difficulty in mounting transducers having a length of several meters and being accordingly highly directional even at low frequencies, on the hull of a ship or on either side of the keel.

When using the system according to the invention in shallow water, the motion of the ship makes the beam of a transducer radiating to one side of the course sweep a broad strip of the sea bottom, the outer boundary line of which is at a distance from the course line equal to the range limit, the inner boundary occurring at the line where the sound pulses arriving obliquely from above first strike the bottom. By installing two transducers one on each side of a ship two strips of the sea bottom parallel to the ship's course are scanned simultaneously while the ship makes a headway.

When employing this device for detecting fish in deep water the scan covers a prismatic volume having a semi-circular cross-section provided that each transducer has a beam width of 90 degrees in the transverse plane. It may be preferable, however, to use a smaller width omitting a section of about 30 to 60 degrees below the ship to be filled by the beam of an echo depth recorder of conventional design.

If a school of fish has been ascertained in one of the lateral sectors the ship is turned round and made to cross its earlier course on a perpendicular line at the exact spot where the fish were recorded in order to pass over them and get their exact location and depth by the echo depth recorder.

The invention includes a means for permanently recording the echoes received by the special transducers described above. The type of recorder employed for this purpose is the same as that incorporated in echo sounders. A mark is made on a slowly advancing strip of electrosensitive paper on the reception of an echo by a stylus moving across the strip in synchronism with the emission of the sound pulses. The distance of the mark from a zero line running parallel to one of the edges of the paper strip corresponds to the distance from which the echo was returned. A graduation may be provided for reading the distance and this graduation may, in particular, be corrected for horizontal distance if objects on the sea-bottom are recorded. For regular scanning the ship should proceed on a straight course. Then, on the continuous map-like record obtained, the zero line will show the ship's path. By the help of time markings made on the advancing paper strip and simultaneous recordings of the ship's position and heading the location of obstacles detected on the sea bed may be entered on a hydrographic chart, if required.

In a special embodiment of the invention one or two essentially unidimensional transducers are housed in a submerged torpedo-shaped trailer which is towed by a vessel and is connected to electrical apparatus in the vessel by conductors forming part of the tow line. Accidental deviations of the towing vessel from a straight course are followed by the trailer only with a reduction in amplitude resulting in a better constancy of the horizontal direction of the sound beams and therewith better defined recordings of obstacles than when the transducers are carried on the vessel itself. Moreover, the surface reverberation level at short ranges diminished as the distance from the surface is increased. The depth of the trailer may be controlled by varying the length of the towing cable, the weight of the trailer, the speed of the towing vessel, or other appropriate means. For the purpose of detecting objects lying on or disposed close to the sea bottom, the trailer is preferably towed at a small height above the bottom. This causes the sound rays to strike the bottom under a small grazing angle, an elongated sound shadow being cast on the bottom by objects obstructing the path of the rays. Such a shadow is reproduced on the record as a blank area free from markings due to accidental scattering at the bottom. A similar shadow is present in hollows of the bottom and is sometimes the only indication of their presence obtained.

One object of this invention is using a longish transducer having a substantially unidimensional radiating surface the length of which exceeds ten times the wavelength of the sound emitted and is disposed parallel to the fore-aft line of a vessel for intermittently, during the vessel's progress, emitting sound pulses according to a beam pattern filling a major portion of a quadrant below the horizontal of a plane transverse to the fore-aft line and confined to a narrow angle perpendicular to the plane, in combination with recording the distance of objects as ascertained by pulses reflected therefrom on a slowly advancing recording strip.

Another object is a means for scanning a strip of the sea bottom beside and along the course of a vessel by a fan-shaped laminar sound beam disposed with its plane extension perpendicular to the fore-aft line of the vessel and displaced parallel to itself by the vessel's progress on its way.

A further object of the invention is a means for scanning quadrantal zones of the sea on both sides of a vessel by fan-shaped beams moving along with the vessel and means for recording the distances of objects detected on both sides of the vessel by reflected pulses on different halves of a slowly moving paper strip, the zero line for both of which coincides with the center line of the strip.

Still another object of the present invention is the use of a pair of transducers having substantially unidimensional radiating surfaces housed in an elognated submerged trailer towed lengthwise by a vessel, for emitting and receiving sound pulses on both sides of the trailer in a plane transverse to its axis, the towing cable incorporating electrical conductors connecting the transducers to electrical apparatus in the towing vessel.

Other features of the invention will best be understood from the following description when read in connection with the accompanying drawings, of which:

Figure 1:
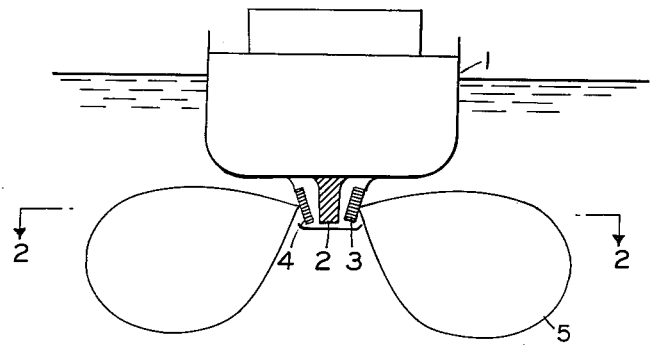
FIGS. 1 and 2 illustrate an installation of two linear transducers one on each side of the keel of a vessel and their directional patterns, FIG. 1 being a vertical sectional view and FIG. 2 a horizontal sectional view.
Figure 2:
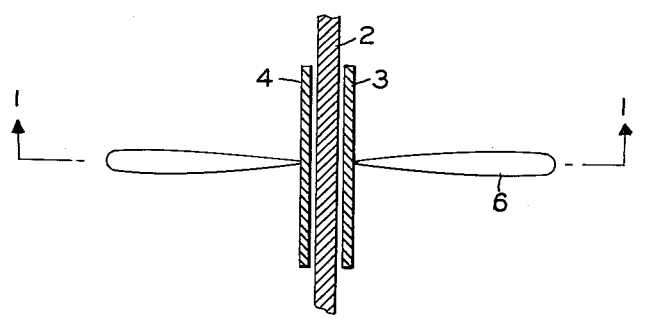

Referring to FIG. 1, a cross section through the hull 1 of a ship is shown with two substantially linear transducers 3 and 4 mounted parallel to the keel 2 under the bottom of the ship. The transducers are of the magnetostrictive type and are tuned to a frequency of 30 kilocycles. Their radiating surface is 3 m. long and about 0.06 m. high, the short dimension having a downward tilt of 10 degrees from the vertical. The proximity of the ship's bottom causes the directional diagrams 5 of the transducers in the plane transverse to the fore-aft line of the ship to have the form shown. The beam fills an angle measured from the horizontal between 0 and —70 degrees. This large beam width is advantageous in that in a search of the sea-bottom the range is only slightly altered by the rolling of the ship. FIG. 2 shows the directional diagram 6 of the transducers 3, 4 in a horizontal plane. The horizontal beam width is only 2 degrees whereby is secured an intensification of the beam and a favorable ratio of the intensity of the useful echoes to the surface and bottom reverberation levels.

Figure 3:
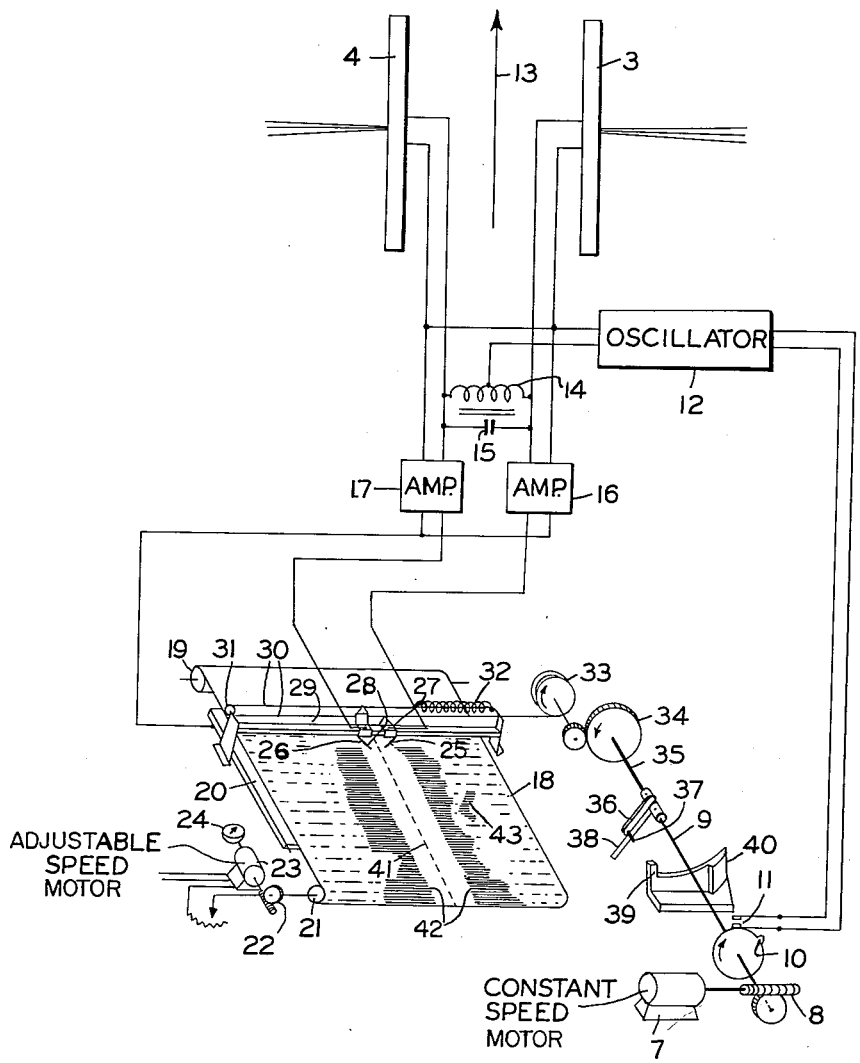
FIG. 3 is a diagram of a circuit for emitting and receiving sound pulses on both sides of a moving vessel and includes a perspective view of the mechanical means provided for the emission of pulses and for appropriately recording the echoes received.

FIG. 3 shows electrical apparatus to be used in combination with the transducers 3, 4 already shown in FIGS. 1 and 2. These transducers are moving through the water in the direction of arrow 13. A constant speed motor 7 drives a shaft 9 through a worm gear 8. A cam 10 is fixed on the shaft 9. In rotating, this cam closes contacts 11 every 1.3 seconds, thus keying the oscillator 12. While energized by it, the transducers 3, 4 emit sound pulses of a few milliseconds duration and having a frequency of 30 kilocycles in a plane transverse to the direction of translation 13 of the transducers.

The output of oscillator 12 is connected to the windings of the two transducers 3, 4 through the two halves of a choke coil 14. A condenser 15 is connected to the terminals of the coil. It is to be noted that the magnetizing effect of the currents passing through the two halves of the choke winding compensate each other in relation to the core, by which circumstance the inductance of the choke is annulled for a current entering at the center tap of the coil. In this, the presence of condenser 15 is irrelevant, both its terminals being at the same potential. The resonant circuit constituted by choke 14 and condenser 15 is tuned to the operating frequency of the transducers. On account of the high resistance it offers to the alternating potentials generated in the transducers on the reception of an echo no interference between these potentials is possible. The potentials generated in the transducers are separately amplified by amplifiers 16, 17, the outputs of which are fed to the marking styli 25, 26.

Echoes are recorded on a strip 18 of electro-sensitive paper, which unwinds from a roll 19, advances over a conducting platen 20 which is connected to the ground return of the amplifiers, and is stored on roller 21. Roller 21 is driven through a worm gear 22 by a variable speed motor 23, to which is connected an instrument 24 for indicating the speed of the paper strip. Scale values on instrument 24 are multiplied by a factor equal to the ratio of half the velocity of sound in water to the speed of the styli 25, 26 and readings are in knots, which facilitates the adjustment of the paper speed in proportion to the speed of the ship in order to secure a definite ratio of the transversal and longitudinal reduction scales on the continuous record, for obtaining a conformal mapping of objects on the sea bottom, for instance, a ratio of one to one.

The styli 25, 26, which are in contact with the recording strip 18, are attached to sleeves 27, 28 slidable on a guide bar 29 made of insulating material and disposed transversally to the recording strip. The sleeves 27, 28 are fastened to an insulating cord or thread 30 passing over a guide pulley 31. One end of the cord is wound around the drum 33 and its other end is joined to a helical spring 32 under tension which keeps the cord taut. Drum 33 is driven at intervals through gears 34 by a shaft 35, a discontinuous rotation of which is produced by the following means. A radial arm 36 the end of which is provided with a pin 37 with its axis parallel to that of shaft 35 is fixed on shaft 35. Pin 37 is engaged by a radial blade 38 mounted on and continuously rotating with shaft 9. This blade is so disposed as to be resilient at its end in the direction of the axis of shaft 9. There are disposed in the path of pin 37 a stop 39 and in the path of the end of the blade 38 projecting beyond pin 37 a wedge-shaped deflector 40. As it runs against this deflector the blade is bent and releases pin 37 whereby shaft 35 and shaft 9 are uncoupled.

Operation is as follows: Shortly before the emission of a pulse initiated by cam 10 closing the contacts 11, pin 37 rests against the left hand side of stop 39, the tension of spring 32 being transmitted through cord 30, drum 33 and gears 34 to arm 36 and tending to turn it in a counter-clockwise direction. The tips of the styli 25, 26 are on the center line of the recording strip 18 in this stage of operation. At the exact moment a pulse is emitted, blade 38 engages pin 37 whereby shaft 9 and 35 are locked together and drum 33 is driven around counter-clockwise. Cord 30 is wound onto drum 33 and styli 25, 26 move with constant speed from the middle to the edges of strip 18. In their traverse they record the received echoes on the strip. Having turned through an angle of about 270 degrees blade 38 engages deflector 40 whereby the connection of shaft 35 to shaft 9 is broken. While the latter continues to rotate, arm 36 and styli 25, 26 are returned to their initial positions under the action of spring 32. The return motion ends with pin 37 coming to rest against stop 39. The next cycle of operation starts 0.3 sec. after the beginning of the return motion with the emission of another pulse. Gears 34 are so dimensioned as to obtain the proper length of traverse of the styli by the clockwise rotation of shaft 35.

The time of traverse being made one second the maximum distance of an obstacle which may be recorded is 750 meters. Recording of echoes originating from accidental scattering at the bottom begins on line 42 at a certain distance from zero line 41. This distance corresponds to the distance of the transducers from the bottom measured along the lower edge of the sound beam. A marking indicating a wreck on the seabed is shown at 43. A blank spot adjoining it represents the shaded area on the bottom.

Figure 5:
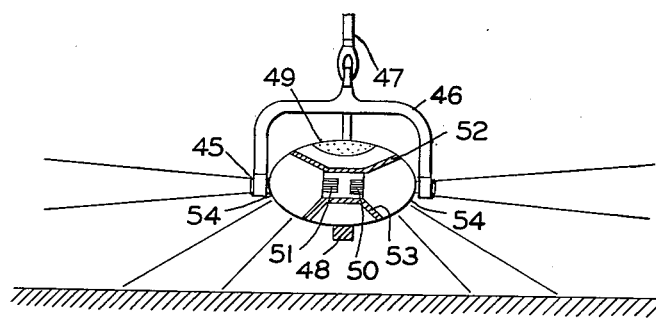
FIGS. 4 and 5 illustrate a submerged trailer comprising two substantially linear transducers emitting and receiving sound pulses on both sides of the trailer's course, FIG. 4 being a side elevation of the device and FIG. 5 a vertical sectional view.
Figure 4:
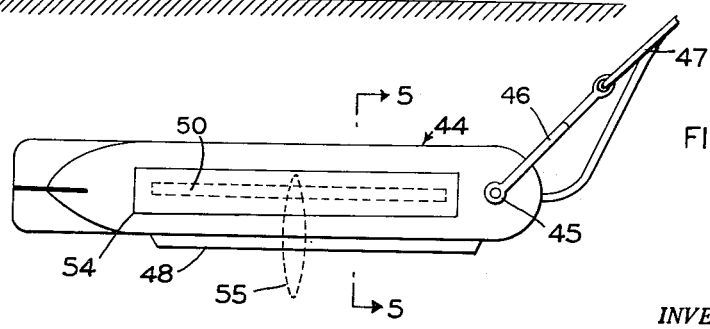

FIGS. 4 and 5 show a submerged trailer carrying two transducers, which is adapted to be towed by a vessel and to be used in combination with the electrical apparatus shown in FIG. 3. The body 44 of the trailer is in the shape of a long cylinder having an elliptical cross-section. It is connected to the tow line 47 through a forked link 46, which is pivoted on horizontal studs 45 fixedly secured to the nose of the trailer. The purpose of this device is to prevent the trailer from rolling. In addition proper orientation of the trailer in the water is enforced by the provision of a leaden keel 48 on its underside and a buoyant filling 49 near its top. A heavy weight, not shown, is incorporated in the nose of the trailer. The resultant of all upward and downward forces passes through the axis of the studs 45. Two substantially linear magnetostrictive transducers 50, 51 are enclosed in the hull of the trailer 44 with their long dimension parallel to the longitudinal center line of the trailer. They are adapted to transmit and receive sound pulses having a frequency of 30 kilocycles in a transversal plane on both sides of the trailer. The radiating surfaces are rectangular in shape, with a length of 1.50 meters and a height of 0.04 meters. The width of the sound beam in the horizontal plane is about 4 degrees. In the transversal plane of the trailer the beam is limited to a sector between angles of +5 and −45 degrees with the horizontal by baffles 52, 53 which are made of wooden boards covered with foam rubber or cork slabs. In front of the radiating surfaces of the transducers the sheating of the trailer consists of a thin metal sheet 54 or some plastic material not impeding the transmission of sound waves through it. A cross-section of the sound beam taken at some distance from the radiating surface is shown at 55.

The height of the trailer above the sea bottom can be easily ascertained by the distance from which the scattering at the bottom is first returned, the height being equal to 0.7 times this distance. By towing the trailer at a small height above the bottom only a small expanse just under the trailer is left unexplored.

The scope of the invention is not limited to the embodiments described. In particular, substantially linear transducer may be installed near the bow of a ship at an angle to the fore-aft line in a horizontal plane, in which case the traverses of the recording styli have to be arranged to include a complementary angle with the negative direction of the paper feed. If a faster sequence of pulse emissions is desired, a plurality of transducers operating alternately at different frequencies may be provided.

What is claimed is:

1. Apparatus for detecting and locating objects in the sea and on the sea bottom from a vessel moving along a course line generally parallel to the longitudinal axis of said vessel, comprising, a source of sonic pulses aboard said vessel, receiving means aboard said vessel, a trailer towed by said vessel, two substantially linear transducers housed in said trailer arranged with oblong radiating surfaces on opposite sides of said trailer, the larger dimension of said surfaces being generally parallel to said course line and having a length of more than ten times the wave length of sonic energy of the same frequency as that of said sonic pulses, a tow line between said vessel and trailer, said tow line having electrical conductors connecting said transducers to said source of sonic pulses and said receiving means, a recording strip aboard said vessel, styli initially positioned opposite a point on said recording strip corresponding to said course line, means for slowly moving said strip along a first direction, means for deflecting said styli transversely to said first direction in synchronism with emission of said sonic pulses, and means responsive to the output of said receiving means for causing said styli to mark said strip at points spaced from said course line point by distances related to the distances between said trailer and said objects.

2. Equipment for mapping objects on and near the sea bottom by echo-location, comprising elongated carrier means having its greatest dimension forming a horizontal axis, means for moving said carrier means through the water in a direction in alignment with said horizontal axis, an elongated transducer mounted on said carrier means with its greatest dimension parallel to said axis, said transducer having an elongated radiating surface the length of which is parallel to said axis and the width of which is downwardly inclined from the vertical, said length being more than substantially ten wavelengths and the width substantially one wavelength of emitted sound pulses, said transducer adapted to produce sound waves in a beam having a fan-shaped beam pattern occupying approximately a quadrant below the horizontal in a vertical plane transverse to said axis and having a narrow width in a direction perpendicular to said vertical plane, said transducer including means adapted to periodically emit sound pulses in successive beam patterns toward the sea bottom and receive echoes returned from said objects at the sea bottom, recording means comprising means for moving a stylus in synchronism with the emission of said pulses across a recording strip, means connected to said transducer for applying received echo signals to said stylus for recording, means for advancing the recording strip in proportion to the carrier's speed through the water, whereby the echo marks produced along parallel lines during successive stylus traverses combine to form a continuous map of objects at the sea bottom situated in a strip corresponding to the sweep of the transducer beam and running parallel to said horizontal axis on one side of it.

3. Equipment according to claim 2 in which said carrier means comprises a ship travelling on a straight-lined course.

4. Equipment according to claim 2 in which said carrier means comprises a torpedo-shaped submerged trailer towed by a ship pursuing a constant course.

5. Equipment according to claim 3 comprising a pair of transducers symmetrically disposed with reference to a vertical plane through the longitudinal axis of said ship and a pair of recording means symmetrically disposed about the center line of a recording medium for producing plan-position pictures of strips of the sea bottom parallel to and symmetrically disposed about said center line which is representative of said ship's course.

6. Equipment according to claim 4 comprising a pair of transducers symmetrically disposed with reference to a vertical plane through the longitudinal axis of said trailer and a pair of recording means symmetrically disposed about the center line of a recording medium for producing plan-position pictures of strips of the sea bottom parallel to and symmetrically disposed about said center line which is representative of said trailer's course.

References Cited in the file of this patent

UNITED STATES PATENTS

| | | |
|---|---|---|
| 1,662,247 | Hahnemann | Mar. 13, 1928 |
| 2,447,333 | Hayes | Aug. 17, 1948 |
| 2,480,561 | Ewing et al. | Aug. 30, 1949 |
| 2,623,116 | Rymes | Dec. 23, 1952 |
| 2,741,754 | Miller | Apr. 10, 1956 |
| 2,761,117 | Green | Aug. 28, 1956 |

FOREIGN PATENTS

| | | |
|---|---|---|
| 301,034 | Great Britain | Feb. 21, 1930 |